United States Patent [19]

Abe et al.

[11] Patent Number: 4,766,860
[45] Date of Patent: Aug. 30, 1988

[54] WARNING SYSTEM OF FILTER BINDING IN LIQUID SUPPLYING SYSTEM

[75] Inventors: Koji Abe; Masao Fukasawa; Masaki Okazaki, all of Hamamatsu, Japan

[73] Assignee: Shanshin Kogyo Kabushiki Kaisha, Hamamatsu, Japan

[21] Appl. No.: 15,745

[22] Filed: Feb. 17, 1987

[30] Foreign Application Priority Data

Mar. 17, 1986 [JP] Japan .................. 61-56962

[51] Int. Cl.⁴ .............................................. F01M 1/00
[52] U.S. Cl. .......................... 123/196 A; 123/73 AD; 123/198 DB; 123/196 S; 184/108
[58] Field of Search .......... 123/196 R, 196 A, 196 S, 123/73 AD; 184/108

[56] References Cited

U.S. PATENT DOCUMENTS

| | | | |
|---|---|---|---|
| 1,496,306 | 6/1924 | Duhamel | 123/196 S |
| 3,773,144 | 11/1973 | Hummel | 123/196 A |
| 3,929,110 | 12/1975 | Raikov et al. | 123/196 R |
| 3,992,296 | 11/1976 | Nobuta | 137/557 |
| 4,012,012 | 3/1977 | Ligler | 123/196 S |
| 4,075,099 | 2/1978 | Pelton et al. | 123/196 A |
| 4,615,413 | 10/1986 | Stevenson | 184/108 |
| 4,637,355 | 1/1987 | Odashima | 123/196 A |

FOREIGN PATENT DOCUMENTS 211706 11/1984 Japan .................. 184/108
101213 6/1985 Japan .................. 184/108

Primary Examiner—E. Rollins Cross
Attorney, Agent, or Firm—Ernest A. Beutler

[57] ABSTRACT

A number of embodiments of outboard motors incorporating lubricating systems having a filter for filtering gravity flow of lubricant to the engine and for sensing a clogged filter condition. In each embodiment, a warning is given when the filter clogging condition is noted and furthermore there is provided an arrangement for reducing the speed of the engine and accordingly the lubricant consumption in response to such a clogging condition. In addition, the sensing device also provides an indication of the level of lubricant within the reservoir.

33 Claims, 8 Drawing Sheets

WARNING SYSTEM OF FILTER BINDING IN LIQUID SUPPLYING SYSTEM

BACKGROUND OF THE INVENTION

This invention relates to a warning system for filter binding in liquid supplying systems and more particularly to an improved filter warning device and related engine control for an internal combustion engine lubricating system.

It is well known in many forms of lubricating systems to employ a filter for filtering the lubricant that is delivered to the engine components. It is also known to provide arrangements for indicating when the filter becomes clogged. However, all of the systems of the aforenoted type have positioned the filter in the pressure line of the lubricating system and hence the warning device can operate on the substantial pressure differential between the inlet and outlet sides of the filter. In many forms of application, however, it is desirable to position the filter in a non-pressurized portion of the lubricant conduit. Furthermore, many systems employ relatively low pressure or gravity lubrication systems and the prior art type of filter warning devices have not lent themselves to use in such low pressure systems.

It is, therefore, a principal object of this invention to provide an improved filter warning device for a lubricating system.

It is another object of this invention to provide a filter warning arrangement for a low pressure lubricating system.

It is yet another object of this invention to provide a filter warning device for a gravity feed lubricant system.

One form of lubricating system that is becoming widely used is employed in connection with the two-cycle engine of an outboard motor. Although two-cycle engines are normally lubricated by mixing lubricant with the fuel, such arrangements have a number of disadvantages. For example, this type of arrangement requires the operator to premix lubricant with the fuel and thus gives rise to the possibility of the operator forgetting to add lubricant or adding improper amounts of lubricant. In addition, the premix systems normally result in an arrangement wherein a given lubricant to fuel mixture is employed regardless of the running conditions of the engine even though the engine lubricant demands vary.

Recently, it has been proposed to employ a separate lubricating system for a two-cycle outboard motor wherein a separate lubricant reservoir is provided and the lubricant is fed from this reservoir to the engine for its lubrication by means of some form of pumping device. With such an arrangement, it is desirable to provide a filter in the lubricant reservoir for filtering the lubricant that flows from the reservoir to the remotely positioned lubricant pump. However, this type of application has the disadvantage that it is difficult to determine when the lubricant filter becomes clogged. The aforenoted prior art type of warning devices are not usable with this type of a system because of the fact that lubricant flows through the filter by gravity.

It is, therefore, a further object of this invention to provide an improved lubricant system for an outboard motor.

It is another object of this invention to provide an improved warning system for the filter of an outboard motor lubricating system.

As has been previously noted, certain forms of lubricating systems have provided warning devices for indicating when the filter becomes clogged. Although such warning devices are extremely advantageous, they are to no avail if the operator ignores the filter clogged warning signal. Furthermore, the warning may be such that the operator may not notice it and if appropriate action is not taken, the engine or machine lubricated can very well be damaged due to lack of adequate lubricant.

It is, therefore, a further object of this invention to provide an improved lubricating system wherein the device being lubricated is protected in the event of filter clogging.

It is a further object of the invention to provide a lubricating system for an internal combustion engine embodying a filter and wherein the speed of operation of the engine is reduced in the event the filter becomes clogged.

SUMMARY OF THE INVENTION

A first feature of this invention is adapted to be embodied in a lubricating system for an engine or the like that has a lubricant reservoir and conduit means for delivering lubricant from the lubricant reservoir to an element of the engine lubricating system by the force of gravity. A filter is provided for filtering the lubricant prior to delivery to the engine lubricating system element and means are provided for giving an indication of clogging of the filter.

Another feature of the invention is adapted to be embodied in a lubricating system for an internal combustion engine having a lubricant reservoir and conduit means for delivering lubricant from the lubricant reservoir to the engine for lubricating the engine. A filter is incorporated for filtering the lubricant delivered to the engine from the reservoir and means are provided for reducing the speed of the engine when the filter becomes clogged.

DETAILED DESCRIPTION OF THE PREFERRED EMBODIMENTS

Figure 1:
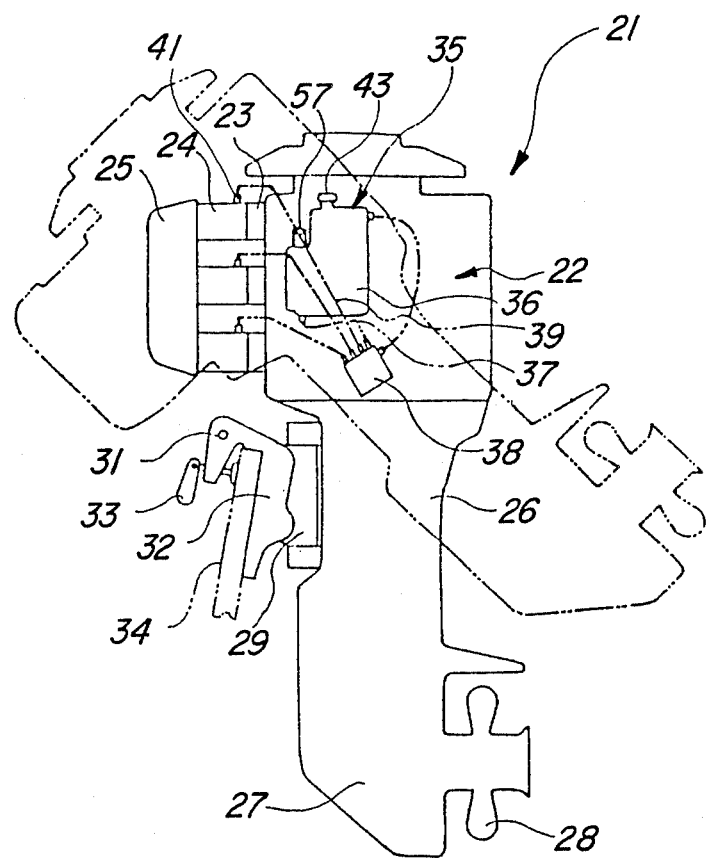
FIG. 1 is a side elevational view of an outboard motor lubricated in accordance with a lubricating system constructed in accordance with a first embodiment of the invention.

Referring first to FIG. 1, an outboard motor having a lubricating system constructed in accordance with a first embodiment of the invention is identified generally by the reference numeral 21. The invention is described in conjunction with an outboard motor because the invention has particular utility in two-cycle crankcase compression engines which normally form the power plant of such outboard motors. It is to be understood, however, that the invention is capable of use with other applications and may be used with engines other than those of two-cycle type. In fact, certain facets of the invention may be utilized in conjunction with other types of machinery. It is to be understood, however, that facets of the invention have particular utility in connection with outboard motors.

The outboard motor 21 includes a power head consisting of an internal combustion engine, indicated generally by the reference numeral 22 and a surrounding protective cowling which has been eliminated from FIG. 1 so as to more clearly show the construction. As has been noted above, the engine 22 is of the two-cycle crankcase compression type in the illustrated embodiment. The specific details of the construction of the engine 22 are not relevant to the invention. However, the engine 22 includes an intake manifold 23 that has a number of runners equal to the number of cylinders of the engine and each of which is fed with a fuel/air mixture from a respective carburetor 24. An air silencer device 25 provides silenced air to the carburetors 24.

The engine 22 has its crankshaft (not shown) rotatable about a vertical extending axis, as is normal practice in connection with outboard motors, and drives a drive shaft (not shown) that is journaled within a drive shaft housing 26. A lower unit 27 depends from the drive shaft housing 26 and contains a forward, neutral, reverse transmission (not shown) which drives a propeller 28 in a known manner.

A steering shaft (not shown) is journaled within a swivel bracket 29 for steering movement about a generally vertically extending steering axis so that the outboard motor 21 may be steered in a known manner. The swivel bracket is, in turn, connected by a pivot pin 31 to a clamping bracket 32 for pivotal movement of the outboard motor 21 about a horizontally extending axis for trim adjustment and also so that the outboard motor 21 may be tilted up an out of the water condition as shown in phantom in FIG. 1. The clamping bracket 32 contains a clamping device 33 for affixing the outboard motor 21 to a transom 34 of an associated watercraft.

The construction of the outboard motor 21 and specifically of its engine 22 as thus far described may be considered to be conventional and, for that detail, only the general major elements of the construction have been illustrated and described. The invention, however, relates to the lubricating system for the outboard motor 21 and specifically its engine 22.

The lubricating system includes a lubricant reservoir 35 that is supported within the protective cowling and which may be mounted directly to the engine 22 in a known manner. The reservoir 35 is comprised of an outer housing 36 that delivers lubricant from a conduit 37 to an engine driven lubricant pump 38. The lubricant pump 38 may be driven in any known manner, for example, by means of the output shaft of the engine 22 and delivers lubricant to the engine. The manner in which the lubricant is delivered may vary with the specific application and, in the illustrated embodiment, the lubricant is delivered to the induction system by means of a plurality of conduits 39 and spray nozzles 40 that discharge into the individual runners of the intake manifold 23. It is to be understood that the specific manner in which lubricant is delivered to the engine may vary from application to application and the system described by reference to FIG. 1 may be considered to be exemplary only of a preferred embodiment of the invention.

Figure 2:
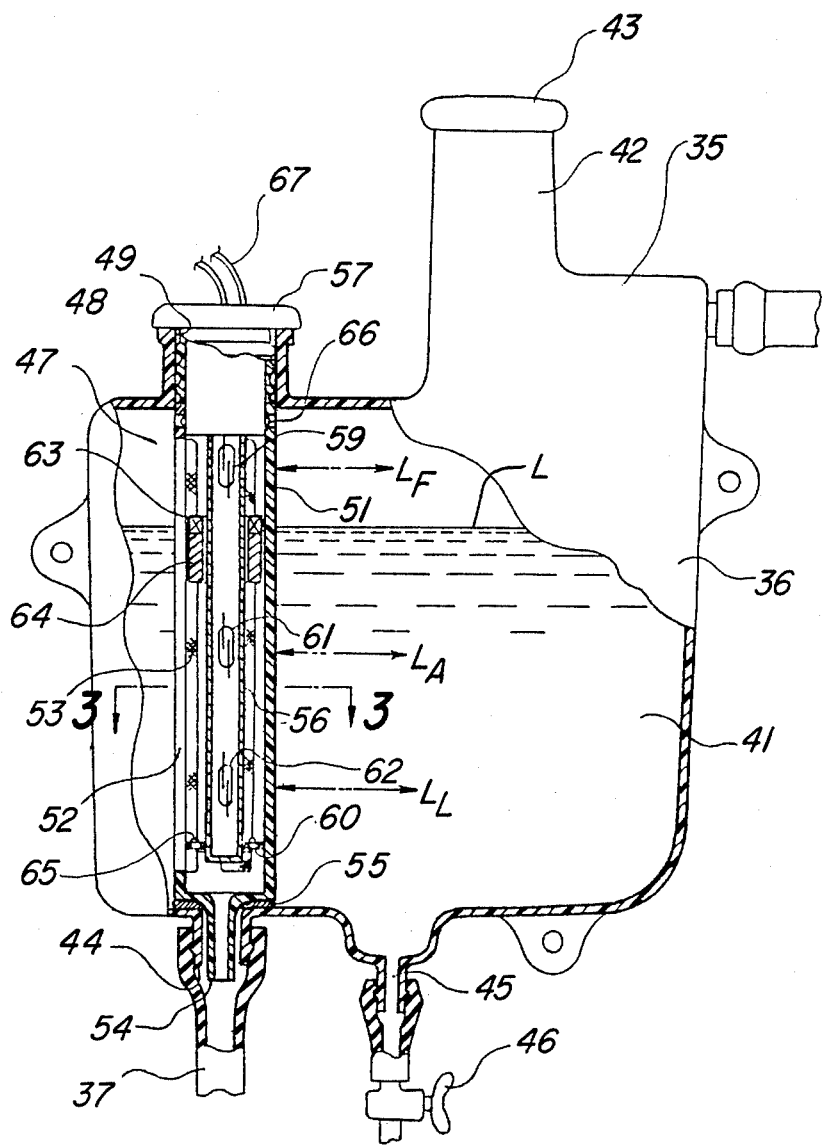
FIG. 2 is an enlarged view, with portions broken away and other portions shown in section, of the lubricant reservoir of the outboard motor shown in FIG. 1.
Figure 3:
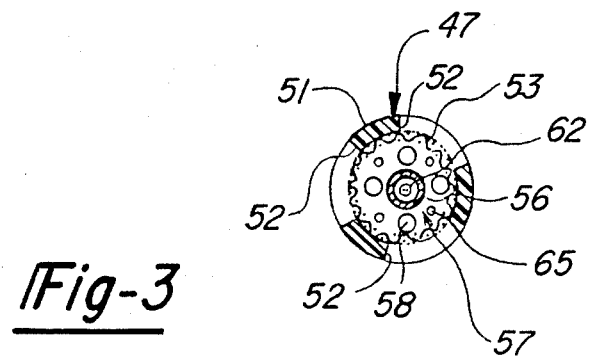
FIG. 3 is a further enlarged cross-sectional view taken along the line 3—3 of FIG. 1.

Referring now to FIGS. 2 and 3, the lubricant tank 35 defines an internal cavity 41 in which lubricant may be received to a level L. Lubricant is added to the reservoir 35 through a fill neck 42 which is closed by a filler cap 43. Preferably, the outer cowling of the outboard motor is such that the filler cap 43 may be readily accessible without removing the protective cowling.

The lower wall of the lubricant reservoir housing 36 is provided with a downwardly extending flange or fitting 44 over which the conduit 37 is received. In this way, lubricant may flow by gravity from the internal cavity 41 through the conduit 37 to the lubricant pump 38 for delivery to the associated engine.

The lower wall of the lubricant reservoir housing 36 is also provided with a second fitting 45 to which a petcock 46 is fitted so as to permit draining of the lubricant from within the cavity 41.

In accordance with the invention, a combined lubricant filter and sensor assembly, indicated generally by the reference numeral 47 is positioned within the lubricant reservoir 35. To this end, the reservoir housing is provided with an upwardly extending neck 48 that has an opening 49 that receives a cylindrical outer body 51 of the assembly 47. The body 51 is provided with a plurality of circumferentially spaced openings 52. The openings 52 will permit lubricant to flow from within the cavity 41 into the hollow interior of the body 51. However, an annular filter screen 53 extends across these openings so as to filter out impurities that pass through the openings 52.

The body 51 is provided with a nipple portion 54 at its lower end which extends through the opening 44 in the lower tank wall for delivery of the filtered lubricant to the conduit 37. An annular gasket 55 encircles the opening 44 and engages the lower end of the body 51 to prevent any lubricant from leaking directly into the opening 44 without first having to pass through the filter screen 53.

In addition to providing a filter, the assembly 47 also provides an indicator mechanism for indicating the level of liquid within the reservoir 35 and/or the condition of the filter screen 53. This indicator mechanism includes a cylindrical inner support tube 56 that is supported at its upper end by means of an elastomeric stopper 57 that is received within the inner end of the body 51 and which sealingly engages the upper end of the reservoir opening 49. The support tube 56 is also supported at its lower end by means of a stopper plate 60 that encircles the tube 56 and is contained within the body 51 and also which supports the lower end of the screen 53. The stopper plate 60 is provided with a plurality of openings 58 (FIG. 3) so that oil may flow freely down through it to the nipple 54.

The tube 56 also carries three reed type magnetic switches 59, 61 and 62. The switches are disposed so that the switch 59 indicates a normal maximum oil level $L_F$ within the reservoir 35, the switch 61 indicates an oil level, indicated by the line $L_A$ which indicates that the lubricant should be replenished, and the lower switch 62 indicates a level $L_L$ which indicates an abnormal or low oil level. The switches 59, 61 and 62 are activated by means of an annular float 64. The float 64 functions so that the magnet 63 will be retained at the lubricant level L when the screen 53 is unclogged.

The stopper plate 60 is provided with a plurality of upwardly extending projections 65 so that when the float 64 is in its lowermost position, the float 64 will not interfere with the flow of lubricant through the openings 58.

The upper end of the outer housing member 51 and/or the stopper 57 is provided with a plurality of circumferential grooves 66 that engage the inner surface of the neck 48 and which function to provide a seal in this area. A series of electrical leads 67 extends through the stopper 57 from the switches 59, 61 and 62 to form a part of an electrical circuit, shown partially in FIG. 4 and which will now be described.

Figure 4:
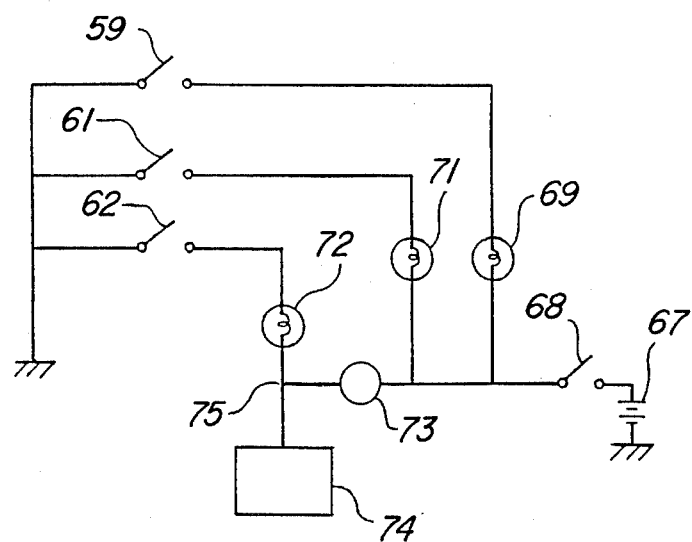
FIG. 4 is a schematic view showing the warning indicating system of this embodiment.

As may be seen in FIG. 4, there is provided a power source in the form of a battery 67 that is in circuit with the ground and a main or master switch 68. The switch 59 is in circuit with an indicator light 69 which may be of an appropriate color, such as green, so that when the switch 59 is closed indicating that the liquid level is at the level $L_F$. When the liquid falls to the level $L_A$, the switch 61 will be closed and complete a circuit through an indicator light 71, which may be of an appropriate color such as yellow so as to give the operator an indication that the liquid level in the reservoir 35 is falling.

When the liquid level reaches the point $L_L$, the switch 62 will close and simultaneously energize a warning light 72, which may be of an appropriate color such as red and, if desired, a warning buzzer 73 so that the operator will be advised that it is time to replenish the liquid in the reservoir or, alternatively, that the filter screen 53 has become clogged, as will become more apparent.

It should be noted that because of the restricted flow of communication between the outer periphery of the outer member 51 and the inner periphery where the float 64 is contained because of the restriction of the screen 53, the liquid levels outside and inside of the outer member 51 will not be exactly the same except under steady state conditions. As a result, the float 64 will drop not only when the level in the reservoir 35 drops but also will drop when the filter becomes clogged and the engine is running. Of course, when the engine is shut off, the liquid levels will stabilize but during running operation, the level of the float 64 will indicate the condition of the filter screen as well as the level of lubricant in the reservoir 35. Hence, if the reservoir 35 has been replenished and the lights 61 and 62 become illuminated at a early stage, the operator will know that the filter screen 53 is clogged and should be serviced.

In order to protect the engine 22 from damage in the event of either a low lubricant level in the reservoir 35 or clogging of the filter screen 53, there is provided a protective circuit 74 which slows the speed of the engine or can, if desired, actually stop the engine. It is preferred that the engine is slowed rather than stopped because this will afford the operator an opportunity to return to shore if necessary. However, the reduced speed of the engine will insure against its damage.

Figure 5:
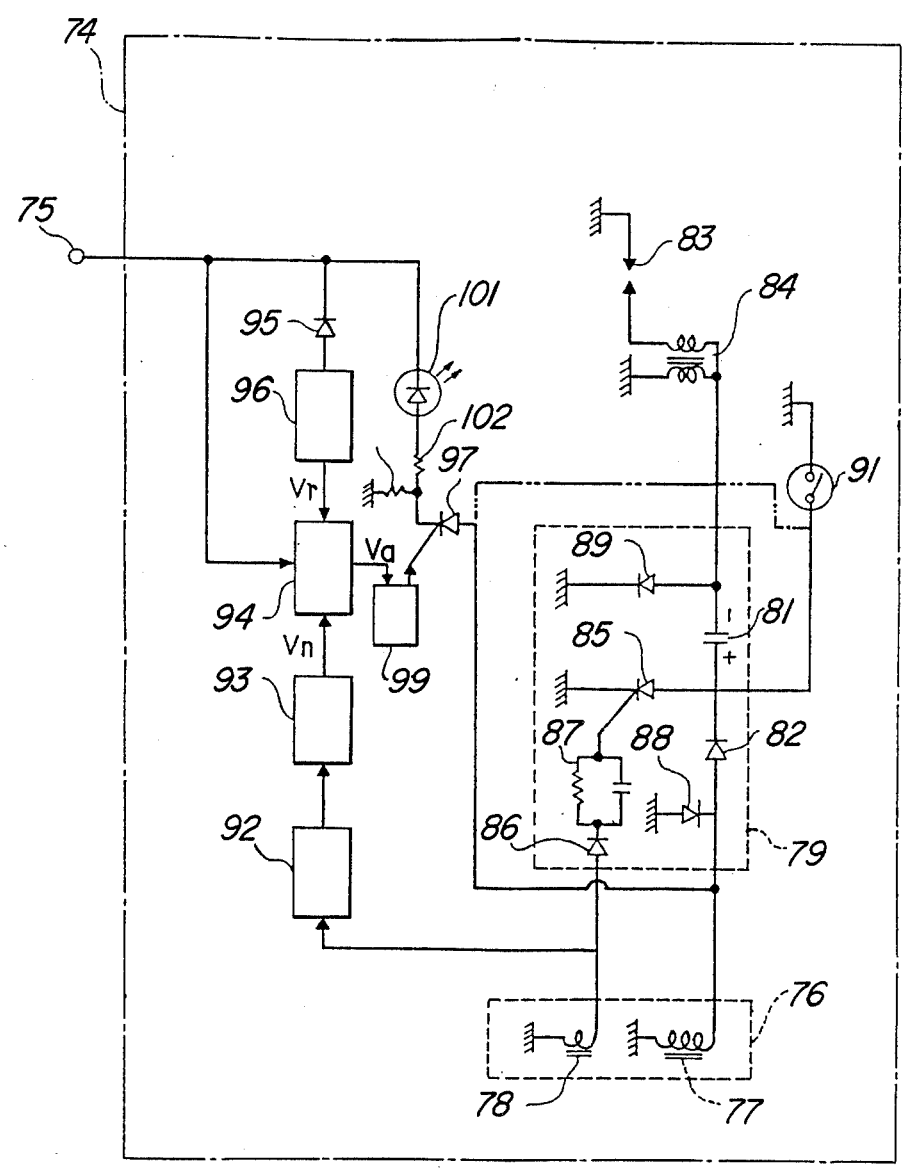
FIG. 5 is a schematic view showing the arrangement for protecting the engine from damage in the event of a clogged lubricant filter.

Referring now to FIG. 5, the connection of the protective circuit 74 to the switch 62 via the warning light 72 is indicated at the point 75.

The ignition system for the engine 22 includes a magneto generator, indicated generally by the reference numberal 76, which may be of any known type and which includes a charging coil 77 and a pulser coil 78. The charging coil 77 and pulser coil 78 provide their signals and charges to a CD ignition circuit, indicated generally by the reference numeral 79.

The CD ignition circuit 79 includes a charging capacitor 81 that is charged from the charging coil 77 through a rectifying diode 82 to a polarity as shown in FIG. 5. A charge will be built up on the capacitor 81 during rotation of the engine crankshaft until an appropriate tripping device such as a rotating magnet causes a voltage to be generated in the pulser coil 78 to indicate that the crankshaft is in the appropriate position to demand firing of a spark plug 83. Of course, there will be one spark plug for each cylinder of the engine 22 and the circuit shown in FIG. 5 is that associated with only a single cylinder of the engine. It should be understood that there will be corresponding circuits for each of the spark plugs of the engine 22. However, it should also be understood that other ignition circuits than that illustrated may be used in conjunction with the invention.

The spark plug 83 is in circuit with a secondary winding of a spark coil 84. The primary winding of the coil 84 is in circuit with the charging capacitor 81 and is adapted to be discharged to ground through an SCR switch 85 under the control of a circuit energized by the pulser coil 78. A trigger signal from the pulser coil 78 is transmitted through a diode 86 and capacitor resistor circuit 87 to the gate of the SCR 85 so as to turn it on and cause the capacitor 81 to discharge. This discharge through the primary winding of the spark coil 84 will cause a voltage to be induced in the secondary winding which will fire the spark plug 83 in a known manner. A diode 88 is placed between the ground and the connection of the coil 77 to the diode 82 for providing a circuit during the negative half wave of the charging coil 77. A similar diode 89 is provided between the capacitor 81 and the primary of the spark coil 84 and the ground.

A kill switch 91 is provided for grounding the circuit to disable the ignition system when the operator wishes to switch the engine 22 off. As has been noted, this portion of the ignition system may be considered to be generally conventional and forms no part of the invention.

As has been noted, a device is incorporated for reducing the running speed of the engine 22 when the warning condition exists and the lubricant in the delivery tank falls below the line $L_L$ or when the screen 53 becomes clogged. This speed reducing system is effective to cause the spark plugs 83 not to be fired for increasing time intervals during a given period of time so that the spark plugs 83 will only fire once every several revolutions of the engine until the speed is reduced to a level wherein the lubricant needs will be substantially reduced. The speed reducing device includes a wave form shaping circuit 92 that receives the outputs from the pulser coil 78 and generates a square wave form pulse from them. This pulse is transmitted to a frequency to voltage converter 93 that provides an output voltage $V_n$ that is indicative of the engine speed. When the terminal 75 is energized, an input will also be provided to an oscillation circuit 94 which receives an input from the frequency to voltage converter in the form of a signal $V_n$ from the converter circuit 93.

Closure of the circuit including the terminal 75 also causes power to be delivered through a diode 95 to a delay circuit 96 which has an output $V_r$ that is also delivered to the oscillator circuit 94. The time delay circuit 96 operates like a capacitor in that its output signal $V_r$ decays along a cirve once the terminal 75 is energized by the closure of the switch 62.

The oscillator circuit 94 has an output voltage $V_a$ that is generated for a time period that is varied in accordance with the difference between the voltages $V_n$ and $V_r$. The output of the oscillator circuit 94 extends for a period $T_1$ during a preset time interval T. The time $T_1$ continues to increase until the voltage $V_r$ has decayed to the point $T_1$ at which it is constant and for a fairly substantial time period. During the time $T_1$ when the oscillator 94 is providing its output, the firing of the spark plugs 83 will be disabled.

This disabling is achieved by providing a shunting circuit that prevents charging of the capacitor 81. This shunting circuit includes an SCR 97 that has its output connected to ground via a resistor 98. The SCR 97 has its gate controlled by a gate circuit 99 that receives the output from the oscillator circuit 94 and which energizes the gate of the SCR 97 for a time $T_1$ as set by the oscillator circuit 94. An LED 101 is also provided in the circuit from the SCR 97 with an interposed resistor 102 so as to provide a flashing indication that the ignition is being disabled to reduce the engine speed.

It should be noted that the time $T_1$ is effective to stop firing of the spark plug 83 for a given time interval during a given time period. Hence, the spark plug 83 will not fire for each revolution of the engine and the engine speed will, accordingly, be reduced so as to reduce the need for lubricant from the delivery tank 25.

The system for reducing the speed of the engine and, accordingly, the lubricant requirement is of the type as shown in U.S. Pat. No. 4,572,120, issued Feb. 25, 1986 in the name of Kuniyoshi Matsumoto, which patent is assigned to the assignee of this application. However, any other suitable arrangement for reducing engine speed so as to reduce lubricant requirements during the time when the lubricant in the reservoir 35 has fallen to the level $L_E$ or, alternatively, the clogging of the filter screen 53 so that the switch 62 is closed may be utilized in conjunction with the invention. Also, as has been noted, the engine 22 may be stopped in response to this condition rather than merely slowed.

Figure 6:
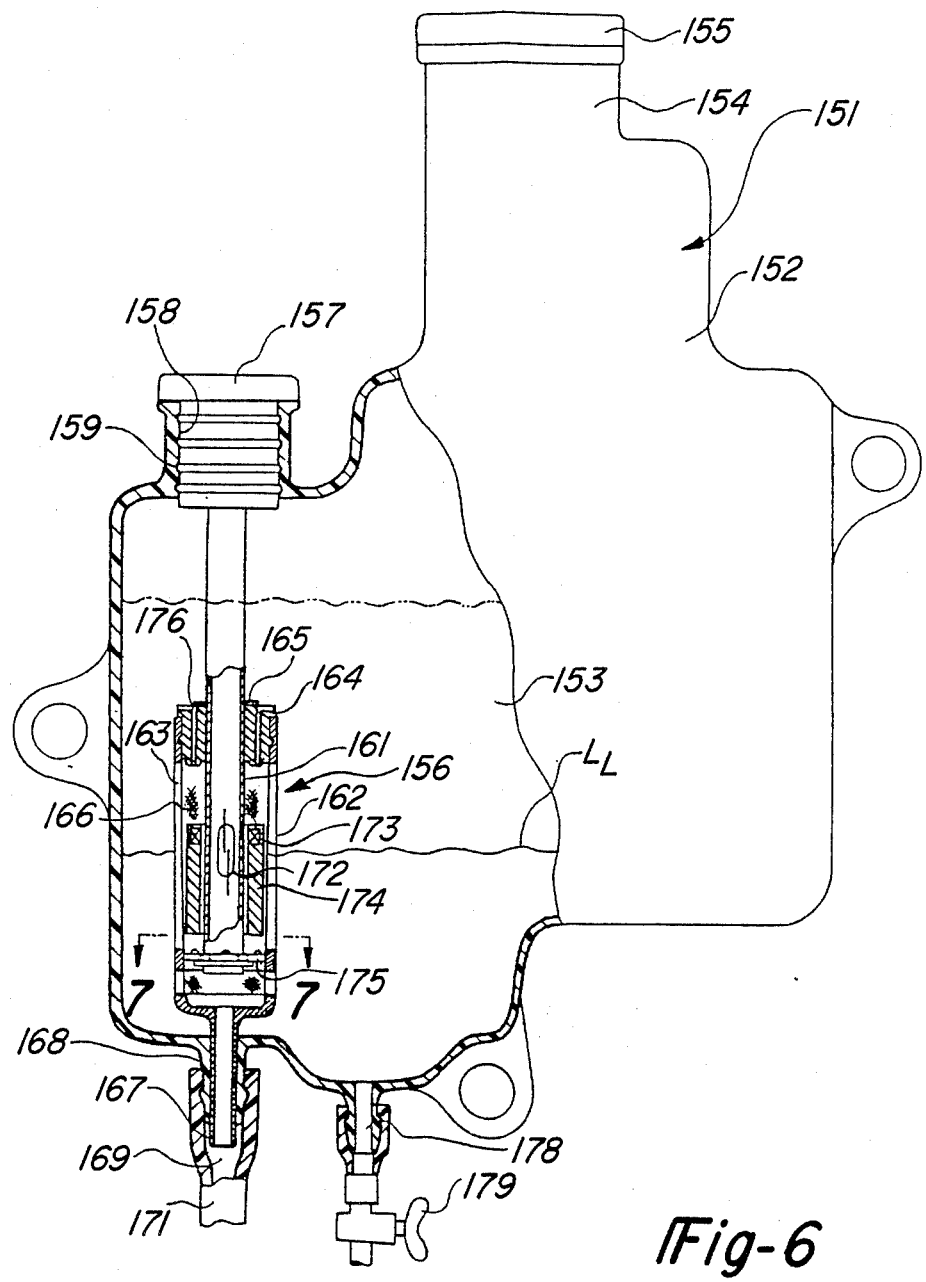
FIG. 6 is an enlarged side elevational view of a lubricant reservoir, with portions broken away and other portions shown in section, similar to FIG. 2, and showing another embodiment of the invention.
Figure 7:
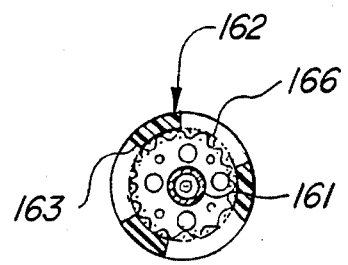
FIG. 7 is an enlarged cross-sectional view taken along the line 7—7 of FIG. 6.

In the embodiment of FIGS. 1 through 5 and specifically in connection with the lubricant storage tank shown in FIG. 2, the combined filter and sensing unit 47 included a device for indicating when the lubricant level was at the full mark, at the mid point mark and also at a low point. It is to be understood, however, that the invention can be utilized in conjunction with an arrangement wherein the warning system only operates in response to a low lubricant level or clogged filter condition and such an embodiment is shown in FIGS. 6 and 7. Since this embodiment differs from the previous embodiment only in the construction of the lubricant storage tank and the warning and filtering system, only this portion of the construction has been illustrated and will be described. It is to be understood, however, that this arrangement may be utilized in the combination as shown in FIGS. 1 through 5.

Referring now to FIGS. 6 and 7, a lubricant storage tank constructed in accordance with this embodiment of the invention is identified generally by the reference numeral 151. The lubricant storage tank 151 has a main body portion 152 that defines an internal cavity 153 that is adapted to receive a lubricant. The main body portion 152 has a fill neck 154 that is closed by a filler cap 155 for permitting replenishing of the lubricant within the tank 151.

In accordance with this embodiment, a combined filter and warning system, indicated generally by the reference numeral 156, is provided in the tank 151. This system includes a supporting stopper 157 that is received within an opening 158 formed in the upper wall of the tank body 152. A suitable seal arrangement 159 is provided between the supporting stopper 157 and the opening 158.

An inner support tube 161 depends from the stopper 157 into the tank interior. A cylindrical housing 162 surrounds the lower end of the supporting tube 161 and is formed with circumferentially spaced openings 163. A closure plug 164 closes the upper end of the housing 162 and is fixed axially to the tube 161 along with the housing 162 by means of a circle clip 165.

A filter screen 166 is disposed within the housing 162 and overlies the openings 163 so as to filter oil that is drawn into the interior of the housing 162 through the openings 163.

The housing 162 is formed with a depending nipple portion 167 that is suitably sealed to the lower wall of the tank housing 152 and which extends through an outlet fitting 168 of the tank housing 152. The nipple 167 terminates within an opening 169 of a conduit 171 that is fixed to the nipple 168 for delivering the filtered lubricant to the lubricating system of the engine as in the previously described embodiment.

In connection with this embodiment, a single reed type switch 172 is carried at the lower end of the supporting tube 161 at a point where the liquid level $L_L$ indicates that the lubricant in the reservoir 151 has almost been depleted. The reed type switch 172 is adapted to be actuated by means of a permanent magnet 173 of a cylindrical form that is carried at the upper end of a float assembly 174 which is slidably supported on the supporting tube 161. A lower stopper plate 175, constructed like the stopper plate 60 of the embodiment of FIG. 2, is provided for limiting the degree of downward movement of the float 174 without restricting the flow through the nipple 167.

As with the previously described embodiment, in the event that the lubricant level in the tank 151 falls to the level $L^L$, the switch 172 will be activated by the magnet 173 to provide a warning signal to the operator. In addition, the engine speed may be slowed through a circuit as aforedescribed. Also, in the event the filter screen 166 becomes clogged, the float 174 will fall even though the level in the cavity 153 may be above the level $L_L$ and the switch will be activated to provide a warning of filter clogging. A plurality of vent passages 176 are formed in the stopper 164 so as to permit flow into the interior of the screen 166 in the event of filter clogging so that the float 174 may fall if the level of the oil in the tank 152 is above the screen 166.

As with the previously described embodiment, the tank housing 152 is also formed with a drain opening 178 in which a valve 179 is provided for permitting draining of the tank 151.

Although they are not shown, the tube 161 and stopper 157 are designed so as to pass electrical conductors for connecting the switch 172 to an appropriate warning and/or speed reducing circuit, as with the previously described embodiment.

Figure 9:
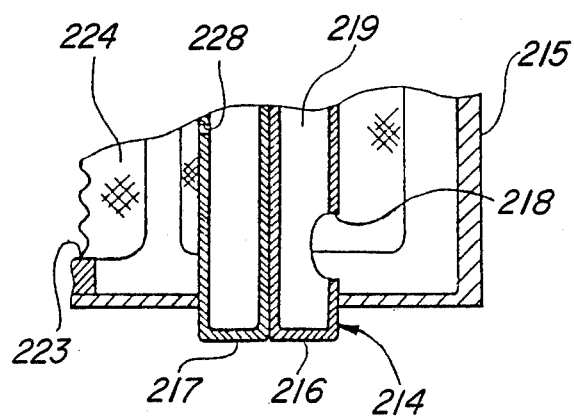
FIG. 9 is an enlarged cross-sectional view taken along the line 9—9 of FIG. 8.
Figure 10:
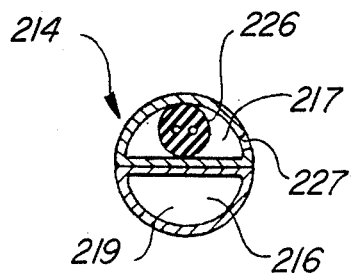
FIG. 10 is an enlarged cross-sectional view taken along the line 10—10 of FIG. 8.

In the embodiments of the invention as thus far described, the lubricant filter and sensing device have been positioned within a lubricant delivery tank that is mounted directly to the engine of an outboard motor. The invention may be practiced, however, in connection with arrangements wherein the engine is provided with a lubricating system including a remotely positioned lubricant storage tank and such an embodiment is shown in FIGS. 8 through 10.

Figure 8:
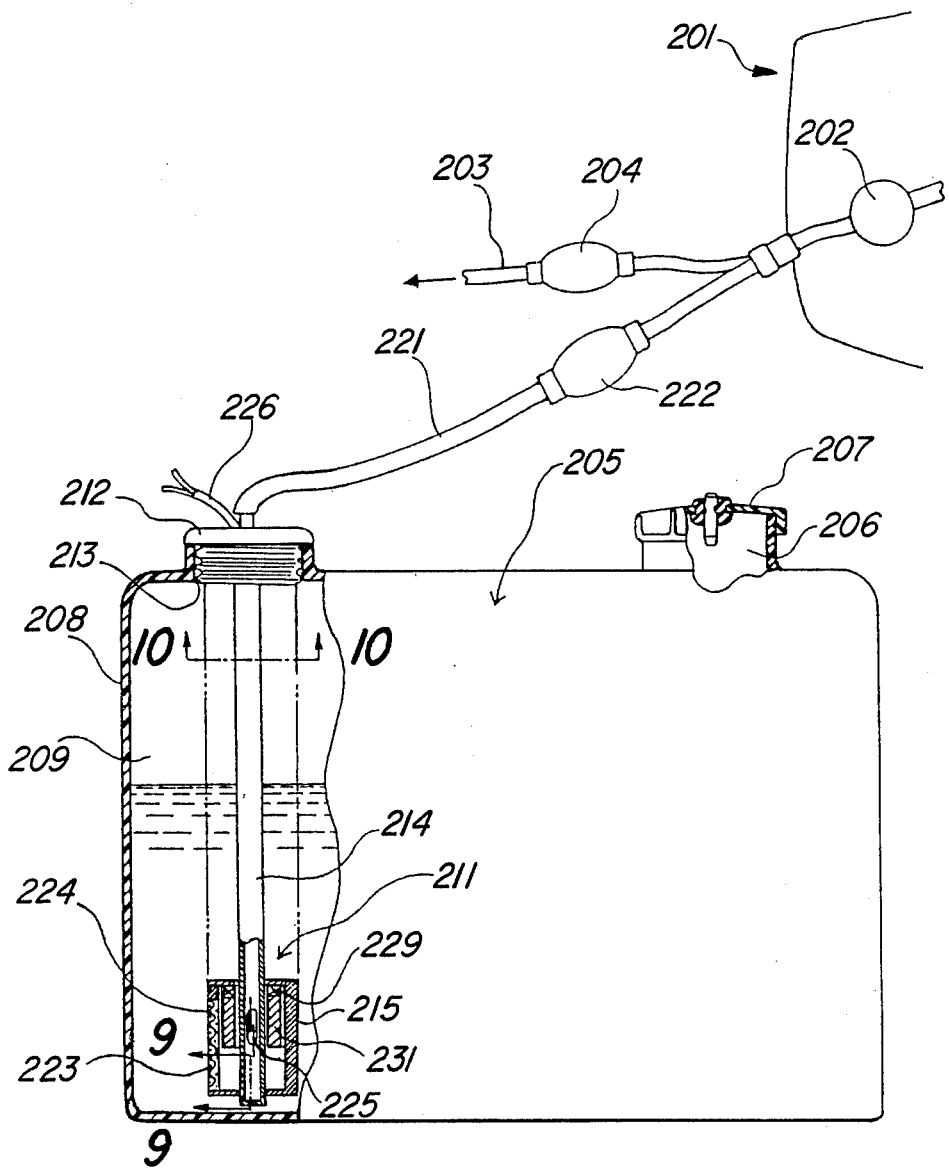
FIG. 8 is an enlarged side elevational view of a portion of an outboard motor and its remotely positioned lubricant tank constructed in accordance with another embodiment of the invention, with portions broken away and shown in section.

Referring to these figures, an outboard motor is shown partially in FIG. 8 and is identified generally by the reference numeral 201. The outboard motor 201 is provided with a fuel pump 202 which is of a known type and which draws fuel from a remotely positioned fuel reservoir (not shown) through a conduit 203 in which a mechanical priming pump 204 is positioned.

Lubricant is supplied to the engine by means of a remotely positioned lubricant storage tank, indicated generally by the reference numeral 205. The lubricant storage tank 205 may be positioned remotely from the outboard motor 201, for example, within the hull of the associated watercraft. The tank 205 has a filler neck 206 that is normally closed by means of vented fill cap 207.

The tank 205 has a main body portion 208 that defines an internal cavity 209 in which the lubricant is positioned. A combined filter and lubricant sensing device, indicated generally by the reference 211, is positioned within the tank interior 209. The device 211 includes a stopper member 212 that is received within an opening 213 formed in an upper wall of the tank body 208. A split pipe assembly 214 depends into the tank interior and carries a body portion 215 at its lower end. As may be readily seen from FIGS. 9 and 10, the pipe 214 is comprised of a pair of semi-cylindrical shaped sections 216 and 217. The sections 216 and 217 are closed at their lower ends. The pipe section 216 has a lubricant inlet opening 218 that registers with the interior of the body portion 215 and defines a vertically extending channel 219 through which lubricant may flow. This lubricant is delivered to a mixing chamber contained within the fuel pump 202 by means of a conduit 221 in which a mechanical priming pump 222 is positioned. In this embodiment, the engine is lubricated by mixing the lubricant with the fuel in the fuel pump 202. It is to be understood, however, that the specific type of lubricating system with which this embodiment is employed forms no part of the invention. For example, the lubricant storage tank 205 may deliver lubricant to a smaller delivery tank mounted on the engine and of the type as shown in either FIG. 2 or FIG. 6.

The body portion 215 is formed with a plurality of circumferentially spaced openings 223 across which a filter screen 224 extends. Hence, lubricant may enter the interior of the body portion 215 through the openings 223 and screen 224. In this way, the lubricant will be filtered before it is delivered to the engine.

Contained within the other of the semi-cylindrical tubes 217 is a reed type switch 225. The reed type switch 225 is disposed at a level above the lowermost level of the lubricant storage tank 205 and, as in the previously described embodiments, operates to provide an indication of low lubricant level or, alternatively, of clogging of the filter screen 224. An electrical conductor 226 is provided for conveying the electrical signal from the reed switch 225 to the indicating circuit and, if desired, a circuit for reducing the engine speed to reduce oil comsumption, as in the previously described embodiments. Restricted apertures 227 (FIG. 10) and 228 (FIG. 9) are provided in the tube portion 217 for venting purposes. The aperture 227 is provided near the upper wall of the tank 205 and the aperture 228 is near the upper end of the body 215. These apertures are preferably independent of the channel 219.

The reed switch 225 is activated, as in the previously described embodiments, by an annular permanent magnet 229 that is carried by a float 231 in the body 215. When the magnet 229 comes into proximity with the switch 225, the switch will be activated to provide a signal indicative that the oil level has dropped within the body 215 indicating that either the filter 224 is clogged or that the oil in the tank 205 has been depleted.

Figure 11:
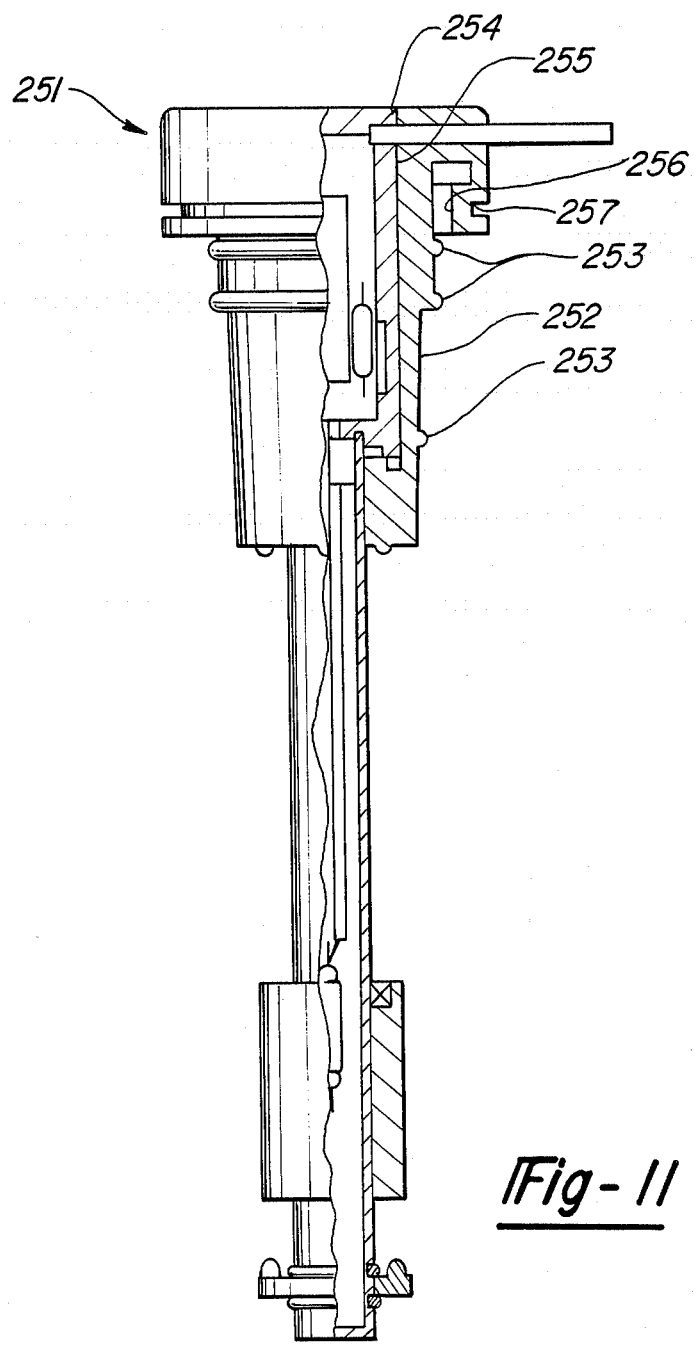
FIG. 11 is a cross-sectional view showing a portion of a lubricant reservoir constructed in accordance with yet another embodiment of the invention.

In each of the embodiments illustrated and described, the filter and warning device is carried by a stopper that is received in a neck formed in the upper wall of the lubricant reservoir. Such stoppers are the stopper 57 of the embodiment of FIGS. 1 through 5, the stopper 157 of the embodiment of FIG. 6 and the stopper 212 of the embodiments of FIGS. 8 through 10. Any suitable arrangement may be incorporated for sealing this stopper to the neck and for removably retaining it. FIG. 11 shows such an arrangement wherein a stopper is indicated generally by the reference numeral 251 and is formed from an elastomeric material having a sleeve portion 252 from which sealing ridges 253 protrude. The upper portion of the stopper is formed with a cylindrical opening 254 in which an upper end 255 of the post of the filter and sensing device is affixed. The annular periphery of the stopper 251 is formed with a groove 256 to receive a neck of the housing for sealing. A 257 may be incorporated for adding flexibility to the assembly so that it can be retained on the neck as shown in this figure.

It should be readily apparent from the foregoing description that a number of embodiments of the invention have been illustrated and described each of which cooperates to provide an effective system for filtering lubricant that is delivered by gravity from a lubricant storage tank to an internal combustion engine. In addition, each system incorporates a filter warning system that indicates when the filter is clogged. Although a number of embodiments of the invention have been illustrated and described, still further changes and modifications may be made without departing from the spirit and scope of the invention, as defined by the appended claims.

We claim:

1. A lubricating system for a machine having a lubricant reservoir, conduit means for delivering lubricant from said lubricant reservoir to an element of said machine lubricating system by the force of gravity, and filter means for filtering lubricant prior to delivery to said machine lubricating system element, the improvement comprising sensing means for providing an indication of clogging of said filter means.

2. A lubricating system as set forth in claim 1 wherein the filter means is positioned upstream of the conduit inlet.

3. A lubricating system as set forth in claim 2 wherein the filter is positioned within the lubricant reservoir.

4. A lubricating system as set forth in claim 3 wherein the sensing means for providing an indication of clogging of the filter means is responsive to the flow restriction through the filter means.

5. A lubricating system as set forth in claim 4 wherein the sensing means is responsive to the level of lubricant on the downstream side of the filter means.

6. A lubricating system as set forth in claim 5 wherein the filter means comprises an annular element having an outer periphery exposed to the lubricant within the lubricant reservoir and an inner periphery communicating with the conduit inlet, the sensing means comprising a float position within the interior of the filter means.

7. A lubricating system as set forth in claim 6 further including means for venting the annular element to the interior of the lubricant reservoir at a point above the maximum float position therein.

8. A lubricating system as set forth in claim 7 wherein the float comprises an annular element supported upon a tubular member affixed to an upper wall of the reservoir and depending into the reservoir.

9. A lubricating system as set forth in claim 8 wherein the venting means comprises passages formed in the tubular member.

10. A lubricating system as set forth in claim 9 wherein the tubular member is divided into two diametrically separated conduits, one of the conduits providing a lubricant passage and the other of the conduits providing a passage to receive an electrical conductor, the venting means being provided in the other of the conduits.

11. A lubricating system as set forth in claim 1 wherein the lubricating system element comprises a lubricant pump.

12. A lubricating system as set forth in claim 11 wherein the machine is an engine of the two-cycle type and the lubricant pump delivers lubricant to the engine for its lubrication.

13. A lubricating system as set forth in claim 12 wherein the filter is positioned within the lubricant reservoir.

14. A lubricating system as set forth in Claim 13 wherein the sensing means is responsive to the flow restriction through the filter means.

15. A lubricating system as set forth in claim 14 wherein the sensing means is responsive to the level of lubricant on the downstream side of the filter means.

16. A lubricating system as set forth in claim 15 wherein the filter means comprises an annular element having an outer periphery exposed to the lubricant within the lubricant reservoir and an inner periphery communicating with the conduit inlet, the sensing means comprising a float position within the interior of the filter means.

17. A lubricating system as set forth in claim 16 wherein the means for providing an indication of clogging of the filter means is effective to slow the engine speed upon clogging of the filter means.

18. A lubricating system as set forth in claim 1 wherein the means for providing an indication of clogging of the filter means is effective to reduce the machine speed upon clogging of the filter means.

19. A lubricating system as set forth in claim 18 wherein the machine is an engine and the engine speed is reduced by interrupting its ignition.

20. A lubricating system as set forth in claim 19 wherein the filter is positioned within the lubricant reservoir.

21. A lubricating system as set forth in claim 20 wherein the sensing means is responsive to the flow restriction through the filter means.

22. A lubricating system as set forth in claim 21 wherein the sensing means is responsive to the level of lubricant on the downstream side of the filter means.

23. A lubricating system as set forth in claim 22 wherein the filter means comprises an annular element having an outer periphery exposed to the lubricant within the lubricant reservoir and an inner periphery communicating with the conduit inlet, the sensing means comprising a float position within the interior of the filter means.

24. In a lubricating system for an internal combustion engine having a lubricant reservoir, conduit means for delivering lubricant from said lubricant reservoir to said engine for lubricating said engine, and filter means for filtering the lubricant delivered to said engine from said reservoir, the improvement comprising means for reducing the speed of said engine when said filter means becomes clogged.

25. In a lubricating system as set forth in claim 24 wherein the means for reducing the speed of the engine is responsive to a reduced flow of lubricant.

26. In a lubricating system as set forth in claim 25 wherein the reduced flow of lubricant is sensed by a reduced flow through the filter means.

27. In a lubricating system as set forth in claim 26 wherein the flow through the filter means is sensed by providing a lubricant reservoir within the filter means and sensing the level of the lubricant within said lubricant reservoir.

28. In a lubricating system as set forth in claim 24 wherein the speed of the engine is reduced by interrupting the spark.

29. A clogged filter indication for lubricating system said filter comprises an annular element having an outer periphery exposed to unpressurized lubricant and an inner periphery communicating with an outlet conduit, the sensing means comprising a float position within the interior of the filter means and moveable in response to the level of lubricant within the interior of said annular element.

30. A clogged filter indication for lubricating system as set forth in claim 29 further including means for venting the annular element at a point above the maximum float position therein.

31. A clogged filter indication for lubricating system as set forth in claim 30 wherein the float comprises an annular element supported upon a tubular member depending into the reservoir.

32. A clogged filter indication for lubricating system as set forth in claim 31 wherein the venting means comprises passages formed in the tubular member.

33. A clogged filter indication for lubricating system as set forth in claim 32 wherein the tubular member is divided into two diametrically separated conduits, one of the conduits providing a lubricant passage and the other of the conduits providing a passage to receive an electrical conductor, the venting means being provided in the other of the conduits.

* * * * *